(12) United States Patent
Jacoby et al.

(10) Patent No.: US 9,052,330 B2
(45) Date of Patent: Jun. 9, 2015

(54) ENHANCED ROTATION MEASUREMENT

(75) Inventors: James Jacoby, Sugar Land, TX (US); Yan Zhao, Irvine, CA (US); William Boag, Lake Forest, CA (US); Francis W. Walker, Jr., Mission Viejo, CA (US)

(73) Assignee: Invensys Systems, Inc., Foxboro, MA (US)

( * ) Notice: Subject to any disclaimer, the term of this patent is extended or adjusted under 35 U.S.C. 154(b) by 885 days.

(21) Appl. No.: 12/857,523

(22) Filed: Aug. 16, 2010

(65) Prior Publication Data

US 2012/0041711 A1 Feb. 16, 2012

(51) Int. Cl.
*G01C 9/00* (2006.01)
*G01P 3/488* (2006.01)

(52) U.S. Cl.
CPC ...................................... *G01P 3/488* (2013.01)

(58) Field of Classification Search
None
See application file for complete search history.

(56) References Cited

U.S. PATENT DOCUMENTS

| | | | |
|---|---|---|---|
| 6,141,769 A * | 10/2000 | Petivan et al. | 714/10 |
| 6,321,525 B1 | 11/2001 | Rogers | |
| 6,711,513 B2 * | 3/2004 | Brown et al. | 702/79 |
| 6,823,275 B2 | 11/2004 | Brown et al. | |
| 7,355,828 B2 | 4/2008 | Jones | |
| 7,509,189 B2 | 3/2009 | Jones | |
| 2008/0098806 A1 | 5/2008 | Shikama et al. | |

* cited by examiner

*Primary Examiner* — Aditya Bhat
(74) *Attorney, Agent, or Firm* — Thomas J. Roth, Esq.

(57) ABSTRACT

An apparatus is provided comprising a detector, a memory, and a logic component. The detector is configured to receive a rotary motion input signal and a counter signal and to send a plurality of time values based on the input signal and the counter signal. The memory stores the plurality of time values in an ordered sequence and is coupled to the detector. The logic component selects time values stored in the memory by skipping a predefined number of time values in the ordered sequence, reads the selected time values to determine a coherent set of data values, and sends the coherent set of data values.

14 Claims, 8 Drawing Sheets

ENHANCED ROTATION MEASUREMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Rotating machinery includes a large variety of equipment. Rotating machinery may include steam turbines, combustion gas turbines, hydo turbines, wind turbines, gas expanders, internal combustion engines, generators in electrical power generation plants, compressors, and other equipment. Accurately determining the rotational mechanical properties of these rotating machines may contribute to controlling these rotational machines, for example to prevent overspeed conditions that may damage the rotational machines and/or that may pose a danger to personnel. The rotational mechanical properties may be rotational velocity, rotational acceleration, and rotational jerk of the rotating machine or device. Rotational velocity may be referred to as the first derivative of angular position with respect to time. Rotational acceleration may be referred to as the second derivative of angular position with respect to time. Rotational jerk may be referred to as the third derivative of angular position with respect to time. Rotational velocity also may be referred to as the time rate of change of angular position. Rotational acceleration also may be referred to as the first derivative of rotational velocity with respect to time—the time rate of change of rotational velocity. Rotational jerk may be referred to as the first derivative of rotational acceleration with respect to time—the time rate of change of rotational acceleration.

SUMMARY

In an embodiment, an apparatus is disclosed comprising a detector, a memory, and a logic component. The detector is configured to receive a rotary motion input signal and a counter signal and to send a plurality of time values based on the input signal and the counter signal. The memory stores the plurality of time values in an ordered sequence and is coupled to the detector. The logic component selects time values stored in the memory by skipping a predefined number of time values in the ordered sequence, reads the selected time values to determine a coherent set of data values, and sends the coherent set of data values.

In an embodiment, a method of determining motion parameters for a rotating machine is disclosed. The method comprises detecting a plurality of rotating target passage events and storing a plurality of time values, wherein each time value corresponds to one of the rotating target passage events. The method further comprises determining in a first processing domain a first rotating target passage count time value, a second rotating target passage count time value, and a third rotating target passage count time value based on the stored time values, wherein the first, second, and third rotating target passage count time values comprise a coherent set of values. The method further comprises determining by a motion parameters process executing in a second processing domain a current machine rotational velocity value, a current machine rotational acceleration value, and a current machine rotational jerk value based on the first, second, and third rotating target passage count time values of the coherent set of values, wherein the velocity, jerk and acceleration values are for use by a motion control process to determine motion control commands.

In an embodiment, a method of determining motion parameters of a rotating machine is disclosed. The method comprises detecting a plurality of rotating target passage events, storing a plurality of time values in an ordered sequence in a memory, wherein each time value corresponds to one of the rotating target passage events, and selecting in a first processing domain a time value stored in memory by skipping a predefined number of time values in the ordered sequence. The method further comprises storing the selected time value in an ordered circular sequence in a first set of registers. In response to a first message received from a second processing domain, storing the time values stored in the first set of registers to a second set or registers and sending a first time value to the second processing domain. In response to a second message received from the second processing domain, sending a second time value to the second processing domain, wherein the second time value was stored in the second set of registers in response to the first message. In response to a third message received from the second processing domain, sending a third time value to the second processing domain, wherein the third time value was stored in the second set of registers in response to the first message.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system for determining mechanical parameter values and controlling rotating machinery is disclosed. In an embodiment, the system determines redundant sets of current mechanical parameter values, determines a voted single set of current mechanical parameter values, determines redundant sets of control commands based on the voted single set of current mechanical parameter values, determines a voted single set of control commands, and sends the voted single set of control commands to the rotating machinery. For example, the rotational velocity, the rotational acceleration, and the rotational jerk of a rotating gear coupled to a rotating turbine are determined by each of three separate subsystems. The three rotational velocities are compared to determine a voted rotational velocity. The three rotational accelerations are compared to determine a voted rotational acceleration. The three rotational jerks are compared to determine a voted rotational jerk. The voted rotational velocity, the voted rotational acceleration, and the voted rotational jerk are then fanned back out to the three separate subsystems, and each of the subsystems determines one or more command outputs. The command outputs of each of the three subsystems are compared to determine a single voted set of command outputs. The voted set of command outputs are then transmitted or sent to the rotating machinery, for example to the steam valve directing steam pressure to an inlet manifold of the rotating turbine. One of skill in the art would recognize that in other embodiments some of the novel features of the system would have applicability in non-redundant systems as well.

In an embodiment, the determination of rotational velocity, acceleration, and jerk by each subsystem is performed by a processor based on a coherent set of tooth count time values. Each tooth count time value comprises a count of gear teeth that has passed by a detector and a clock count value. The gear teeth are located on a gear coupled to the rotating machine and/or device of interest. The gear may be coupled to a steam turbine and may engage a corresponding gear on a generator, whereby the steam turbine provides power input and/or energy input to turn the generator. By knowing the number of gear teeth on the gear and knowing the number of clock counts per unit time, which may be configured or otherwise defined, a rotational velocity of the rotating device can be determined based on the tooth count time value.

It is understood, however, that the present disclosure contemplates determining rotational velocity, acceleration, and jerk by a processor in each subsystem based on a coherent set of rotating target passage count time values. For example, in an embodiment, the detector may monitor a plurality of ferrous plugs installed in a non-ferrous disk (for example a brass disk) coupled to the end of a rotating machine shaft. The ferrous plugs may be referred to as rotating targets. When a ferrous plug passes proximate to the detector, a rotating target passage event is detected by the detector. The gear teeth discussed above may be referred to as rotating targets. The spaces between gear teeth may be referred to as rotating targets. Reflective patches affixed to a rotating shaft of a rotating machine or a rotating disk coupled to a rotating shaft or rotating machine may be referred to as rotating targets. Yet other rotating targets are contemplated by the present disclosure.

The coherent set of tooth count time values or rotating target count time values comprises a series of values that are subsequent to each other. For example, a first tooth count time value may be determined that is associated with the event of a n-th passage of a gear tooth and stored in a memory; a second tooth count time value may be determined that is associated with the event of a (n+1)-th passage of a gear tooth and stored in the memory at a location subsequent to the stored first tooth count time value; a third tooth count time value may be determined that is associated with the event of a (n+2)-th passage of a gear tooth and stored in the memory at a location subsequence to the stored second tooth count time value; a fourth tooth count time value may be determined that is associated with the event of a (n+3)-th passage of a gear tooth and stored in the memory at a location subsequent to the stored third tooth count time value; a fifth tooth count time value may be determined that is associated with the event of a (n+4)-th passage of a gear tooth and stored in the memory at a location subsequent to the stored fourth tooth count time value. A large number of tooth count time values may be stored in subsequent locations of the memory. When the end of the memory is reached, the additional tooth count time values may begin overwriting the oldest values stored in the memory, accessing the memory in a circular fashion.

A coherent data set may be determined by selecting tooth count time values out of the memory at regular predefined intervals or by skipping past a predefined number of locations in the memory. For example, a set of coherent data may be determined by selecting every $48^{th}$ tooth count time value out of the memory, for example, the forty-eighth tooth count time value, the ninety-sixth tooth count time value, the one hundred and forty-fourth tooth count time value. The difference between the clock counts between a selected tooth count value and the prior selected tooth count value in the sequence, where the difference may be determined in a modulo fashion, for example modulo 48, to determine a clock count change or delta. The clock count change and the tooth count change comprise one element of a coherent data set. When the predefined number used for selecting how many locations in memory to skip past is known or configured, the coherent data set may omit specifying the number of tooth count changes, as this is already known. A set of three subsequent data elements determined as described above form a coherent data set.

By converting the clock count change to a time difference, and by converting the number of gear tooth counting events that occurred, for example 48, and by knowing how many gear teeth are on the gear (hence how many gear teeth correspond to a revolution) an angular velocity of the rotating apparatus can be determined. By using the coherent data set, the acceleration and jerk may be calculated on the basis that for each gear tooth time value in the coherent data set the time value measurement begins when the time value measurement of the previous gear tooth value ends. It will be appreciated that the above description can apply equally to counting passage events of a rotating target of any kind.

The coherent data set may be determined and maintained in a first processing domain; the rotational velocity, rotational acceleration, and rotational jerk may be determined by a motion parameters process executing in a second processing domain; and the command signals may be determined by a command process executing in a third processing domain. In an embodiment, the motion parameters process may execute in a first iteration loop in the second processing domain, and the command process may execute in a second iteration loop executing in the third processing domain. The first iteration loop may execute twice as fast as the second iteration loop, three times as fast as the second processing loop, four times as fast as the second processing loop, or even more times faster than the second processing loop. By determining the motion parameters in the first iteration loop, the motion parameters corresponding to higher order mathematical derivatives—rotational acceleration and rotational jerk—may be determined more rapidly, enabling a more rapid response by the control process in the event of an out-of-limit condition. For example, a much increased rotational jerk may indicate disengagement of power from a load, for example a turbine trip, and the control process may desirably remove or reduce motive power, for example close or throttle back inlet steam to a turbine.

Figure 1A:
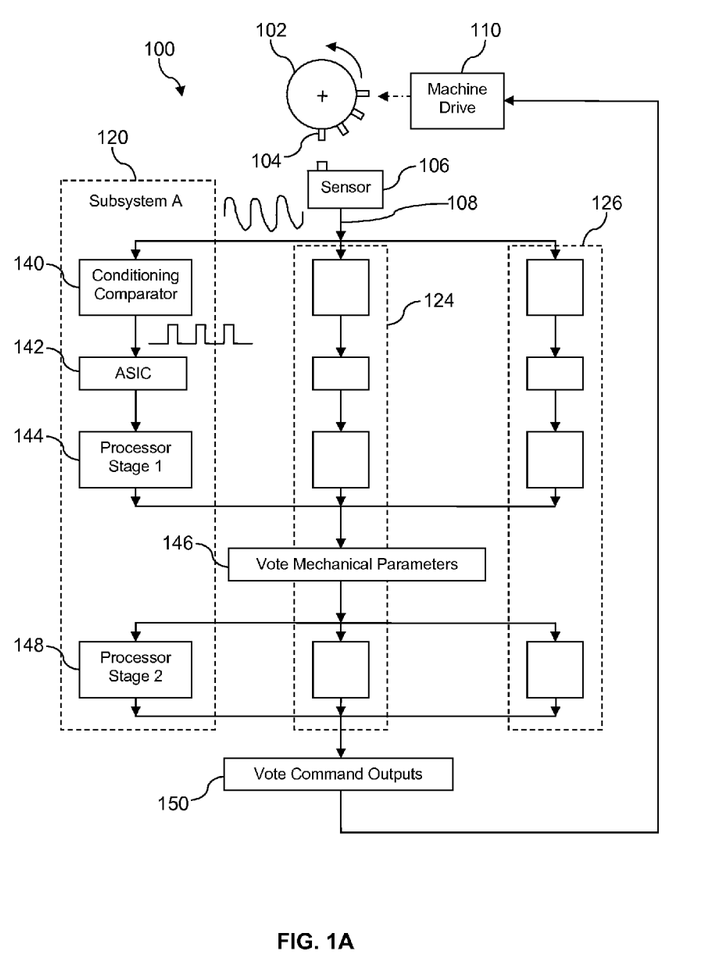
FIG. 1A is an illustration of a system according to an embodiment of the disclosure.

Turning now to FIG. 1A, a system 100 is described. The system 100 comprises a rotating machine 102 having a plurality of gear teeth 104. The rotating machine 102 may be a steam turbine, a water turbine, a wind turbine, an electric generator rotor, an electric motor rotor, or other rotating machine. The number of gear teeth 104 may be any number. The gear teeth 104 may engage a gear coupled to another machine (not shown). For example, if the rotating machine 102 is a steam turbine, the gear teeth 104 may engage a gear or transmission coupled to an electric generator rotor. While the description refers to a gear and gear teeth, it is understood that the description applies equally to any rotating target coupled to any rotating machine.

A sensor 106 senses the passage of the gear tooth 104, producing an output that may be analyzed to determine the passage of the gear tooth 104. In an embodiment, the sensor 106 may be based on a magnetic sensing principle, for example having a permanent magnet wrapped with a coil of wire such that any change in inductance produces a change in flux and results in an output voltage across the coil of wire. As gear teeth pass proximate to the sensor, the inductance changes, thereby producing a varying voltage across the coil of wire. The output may vary proportionally to the speed and proximity of the sensor 106 to the gear tooth 104. In another embodiment, the sensor 106 may operate according to a different principle. For example, the sensor 106 may operate based on an optical principle, for example where an optical beam emitted by a laser diode is blocked by the passage of the gear tooth 104 between the laser diode and a receiver. In an embodiment the output of the sensor 106 may be approximately sinusoidal, where the positive peaks of the sinusoid correspond to the event of detecting the passage of the gear tooth 104. Alternatively, the output of the sensor 106 may be other than sinusoidal, and the variation of the output may indicate the passage of the gear tooth 104 in a different manner.

The output of the sensor 106 may be distributed via a cable 108 to a plurality of subsystems 120, 124, and 126. The length of the cable 108 may be associated with a frequency response based on a distributed capacitance and/or a distributed inductance of the cable 108. In an embodiment, three subsystems 120, 124, 126 are employed to provide triple redundancy, with each subsystem 120, 124, 126 operating substantially independently, but other numbers of subsystems are also contemplated by the present disclosure. For example, some of the benefits of the novel structures and methods of the present disclosure can be applied to a single subsystem. The first subsystem 120 may comprise a conditioning comparator 140, an application specific integrated circuit (ASIC) 142, a stage 1 processor 144, and a stage 2 processor 148. The second subsystem 124 and the third subsystem 126 may have components like those of the first subsystem 120.

The conditioning comparator 140 conditions the input received from the sensor 106, filters the input, and generates a pulse when the input level exceeds a threshold. Thus, the pulse generated by the conditioning comparator 140 corresponds to the event of detecting the passage of the gear tooth 104. The pulse may be generated when the input level drops below a threshold. The pulse is propagated to the ASIC 142. For further details about an embodiment of the sensor 106 and the conditioning comparator 140 see U.S. Pat. No. 6,711,513 B2 by Brown et al. which is incorporated herein by reference.

Figure 2:
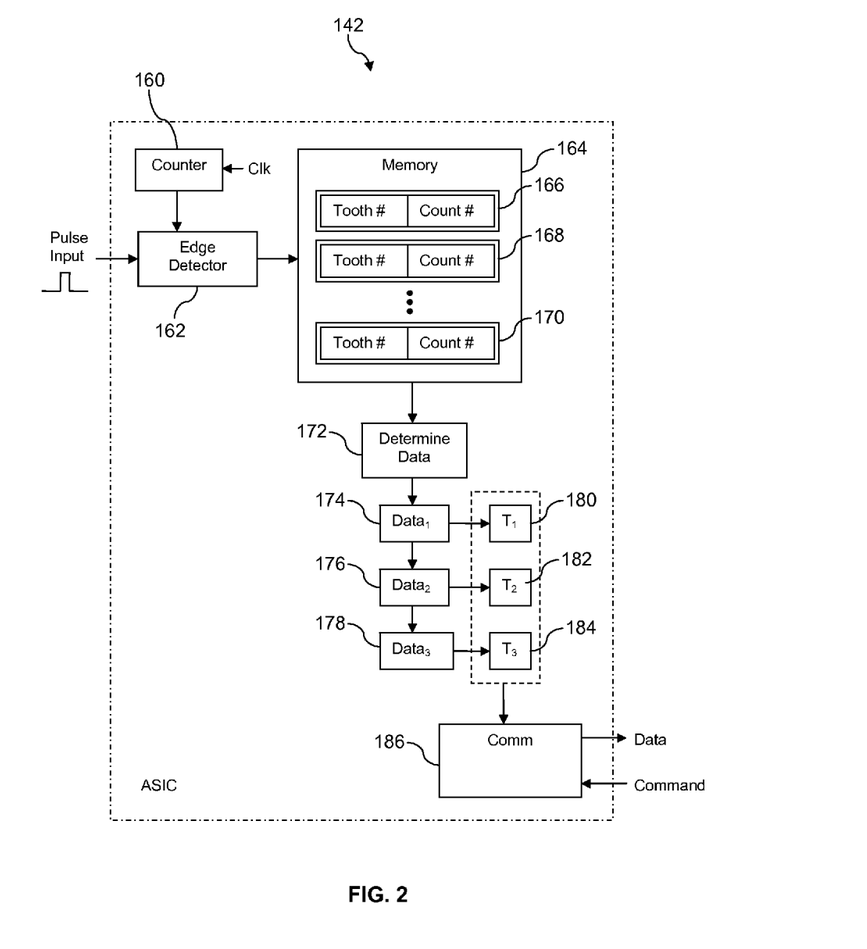
FIG. 2 is an illustration of an application specific integrated circuit (ASIC) according to an embodiment of the disclosure.

Turning now to FIG. 2, the ASIC 142 is described. In an embodiment, the ASIC 142 comprises a counter 160, an edge detector 162, a memory 164, and some logic. The logic may comprise a first logic block 172 for processing the data stored in the memory 164 and a second logic block 186 that performs various functions including communicating with the stage 1 processor 144. The ASIC 142 may further comprise a plurality of registers 174, 176, 178, 180, 182, and 184 that are discussed in greater detail hereinafter. In some contexts, the ASIC 142 may be referred to as a processor or a first processor. In some contexts, the ASIC 142 may be referred to as a first processing domain.

The counter 160 generates a count in response to a clock input. The count is a binary value which rolls over to 0 and resumes counting in a fashion that is circular. The counter may count up or may count down. In an embodiment, the counter 160 may generate a 24-bit count, but in other embodiments the counter 160 may generate a count comprising a different number of bits. As an example, assuming the counter is a 24-bit counter, the counter would count up to 16,777,215, on the next count roll over to 0, and resume counting up. Alternatively, the counter might count down to 0, on the next count roll over to 16,777,215, and resume counting down. The edge detector 162 receives the analog pulse generated by the conditioning comparator 140, filters the analog pulse to exclude ringing, and detects the edge of the pulse to determine the event of a passage of the gear tooth 104. When a rotating target passage event is detected, the edge detector causes the memory 164 to store the current value of the counter in a tooth count time storage location of the memory 164. The memory 164 may comprise a plurality of tooth count time storage locations including a first tooth count time storage location 166, a second tooth count time storage location 168, and a third tooth count time storage location 170. The memory 164 may comprise any number of tooth count time storage locations. In an embodiment, the memory 164 may comprise 240 tooth count time storage locations. The tooth count time storage locations 166, 168, 170 may comprise a tooth number field and a count field. In an embodiment, the tooth number field may comprise 8 bits and the count field may comprise 24 bits. In some contexts, the count field may be referred to as a time field. As each additional tooth detection event occurs, the edge detector 162 writes into the next tooth count time storage location in a pre-determined sequence. As the last location in the memory 164 is written to, on the next tooth detection event the edge detector 162 writes into the first tooth count time storage location 166.

The first logic block 172 is able to periodically determine a data value that represents a number of gear teeth counted and a counter number and to store this value in a first register 174. In an embodiment, the first logic block 172 may determine the data value periodically with respect to the number of tooth detection events. For example, the first logic block 172 may determine the data value once per revolution of the rotating machinery 102, once per two revolutions of the rotating machinery 102, or over some other number of revolutions of the rotating machinery 102, where each revolution is associated with the number of teeth on the gear. Alternatively, the first logic block 172 may determine the data value once per a predefined number of gear teeth that corresponds to less than a complete revolution of the rotating machinery 102. The period for determining the data value may be adjusted as the rotational velocity of the rotating machine 102 changes to maintain a desirable balance between an accuracy of the data value and a latency period between successive data values. For further details about adjusting the period for determining the data value, see U.S. Pat. No. 6,711,513 B2 by Brown et al. which was incorporated by reference above.

Figure 3:
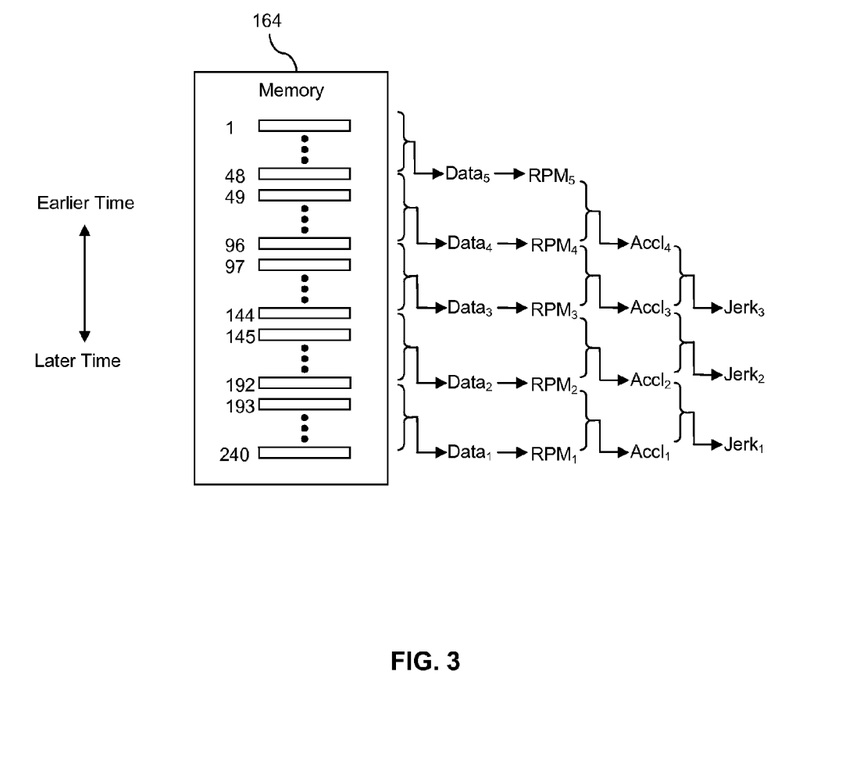
FIG. 3 is an illustration of an arrangement of gear count time values according to an embodiment of the disclosure.

Turning now to FIG. 3, an exemplary layout of the memory 164 is discussed. It is contemplated that other arrangements of the memory 164 may be used. As an example, assuming the number of gear teeth 104 of the gear coupled to the rotating machinery 102 is 48 and that the first logic block 172 determines the data value once per revolution of the rotating machinery 102, the first logic block 172 may read the most recently written tooth count time storage location of the memory 164, for example the location indicated by 240, and the tooth count time storage location 48 positions previous in the memory 164, for example the location indicated by 192. The first logic block 172 may calculate the difference between the tooth count values, for example by subtracting one value from the other value. Because the data stored in the memory 164 may have a circular orientation, the subtraction may be performed according to a modulo, for example modulo 240 if the memory 164 comprises 240 locations. Alternatively, the first logic block 172 may not calculate the difference between tooth count values but instead base this value on the known period of the determining of the data value. In the present example, this value would be known to be 48. The first logic block 172 also may determine the difference between the count values stored in the tooth count time values by subtracting the two values. Again, this calculation may be performed in a modulo fashion, for example modulo $2^{24}$ when the counter 160 is a 24-bit counter. The data value may be said to comprise a delta tooth field and a delta count field. In an embodiment, the data value may comprise 32 bits. In an embodiment, the delta tooth field may comprise 8 bits and the delta count field may comprise 24 bits. In some contexts, the delta count field may be referred to as a time field. A sequence of data values $Data_1$, $Data_2$, $Data_3$, $Data_4$, and $Data_5$ are illustrated in FIG. 3.

Returning to FIG. 2, the previously determined data value, for example $Data_2$, is stored in a second register 176, and the data value determined before the data value stored in the second register 176, for example $Data_3$, is stored in a third register 178. In an embodiment, the data values may propagate from a first register 174 to the second register 176 and from the second register to the third register 178. In such a propagating system, after $Data_3$ has been propagated to the third register 178, then $Data_2$ may be propagated to the second register 176; after $Data_2$ has been propagated to the second register, then $Data_1$ can be written to the first register 174. Alternatively, in an embodiment, the registers 174, 176, 178 may be implemented as a circular data structure where the latest determined data value is overwritten into the register 174, 176, 178 containing the oldest data value. A pointer or other reference to the latest data in the set of registers 174, 176, 178 may be maintained. For example, $Data_4$ may be written into the first register 174 at a first time, $Data_3$ may be written into the second register 176 at a second time, $Data_2$ may be written into the third register 178 at a third time, and $Data_1$ may be written into the first register 174 at a fourth time, where the first time is before the second time, the second time is before the third time, and the third time is before the fourth time. In an embodiment, more than three registers may store the latest determined data values. In an embodiment, the three registers 174, 176, 178 may be 32 bit registers.

Because the data values are determined at a periodic interval and successively, the data values stored in the registers 174, 176, 178 comprise what may be referred to in some contexts as a coherent data set. The coherent data set has the property that the associated data values are determined based on reading values out of the memory 164 from locations that are contiguous in time—the ending memory location for one data value becomes the beginning memory location for the next value. Turning again to FIG. 3, suppose that $Data_1$ is the most recently determined data value, $Data_2$ is the data value determined before the $Data_1$ data value, and $Data_3$ is the data value determined before the $Data_2$ data value. The data value comprising $Data_2$ begins where the data value comprising $Data_3$ ends. Specifically, the delta tooth and delta count fields of $Data_2$ may be determined by subtracting the value of the location indicated by 144, the last gear count time value associated to $Data_3$, from the location indicated by 192, the last gear count time value associated to $Data_2$, using the modulo subtraction methods appropriate to the delta tooth field and to the delta count field, respectively. Likewise, the delta tooth and delta count fields of $Data_1$ may be determined by subtracting the value of the location indicated by 192, the last gear count time value associated to $Data_2$, from the location indicated by 240, the last gear count time value associated to $Data_1$, using the modulo subtraction. Another way of describing the coherent data set is that the data values represent or summarize contiguous sets of samples, where each set often, but not always, comprises the same number of samples.

Because the data values $Data_1$, $Data_2$, $Data_3$ form a coherent data set, they may be used to calculate a rotational velocity, a rotational acceleration, and a rotational jerk. The most current rotational velocity $RPM_1$ can be found to be proportional to the quotient of the delta gear tooth field divided by the delta count field of the $Data_1$ data value. The previous rotational velocities $RPM_2$, $RPM_3$, $RPM_4$, and $RPM_5$ associated respectively to $Data_2$, $Data_3$, $Data_4$, and $Data_5$ may be found in a similar manner. Since rotational acceleration can be determined as the rate of change of rotational velocity with respect to time, the most current rotational acceleration $Accl_1$ can be determined as proportional to the quotient of the difference between the rotational velocities $RPM_1$ and $RPM_2$ divided by the time that passed between the determination of the $Data_2$ data value and the $Data_1$ data value. Because $RPM_1$ is the average speed during the measurement period associated with $Data_1$, and $RPM_2$ is the average speed during the measurement period associated with $Data_2$, this time is indicated by the average of the delta count fields of $Data_1$ and $Data_2$. The previous rotational accelerations $Accl_2$, $Accl_3$, and $Accl_4$ can be found in a similar manner. Since rotational jerk can be determined as the rate of change of rotational acceleration with respect to time, a current rotational jerk $Jerk_1$ can be determined as the quotient of the difference between the $Accl_1$ and the $Accl_2$ divided by the average of the delta counts used to calculate $Accl_1$ and $Accl_2$. The previous rotational jerks $Jerk_2$ and $Jerk_3$ can be found in a similar manner.

Turning back to FIG. 2, the second logic block 186 may receive a command input from the stage 1 processor 144 to capture the coherent data set stored in the three registers 174, 176, 178. The second logic block 186, responsive to this command, may cause the data values to be written from the first register 174 to a fourth register 180, from the second register 176 to a fifth register 182, and from the third register 178 to a sixth register 184. The first logic block 172 continues to determine the data values on the appropriate periodic basis, writing into the registers 174, 176, 178, but the coherent data set stored in the registers 180, 182, 184 remains unchanged. In some contexts, the registers 180, 182, 184 may be referred to as an output register or output registers. In an embodiment, the registers 180, 182, 184 may be 32 bit registers.

In response to the command to capture the coherent data set from the stage 1 processor 144, the second logic block 186 transmits the most recently determined data value, for example Data$_1$, to the stage 1 processor 144 along with an indication of how much of the coherent data set is new since the last time the stage 1 processor 144 sent the command input requesting data values. Depending on how much of the coherent data set is new, the stage 1 processor 144 may send additional command inputs requesting additional data values from the coherent data set. If all of the data values in the output registers have been read already, the second logic block 186 may transmit a value of 0 to indicate how much of the coherent data set is new. For example, if the latest data value is stored in the fourth register 180 and the second latest data value is stored in the fifth register 182 and the third latest data value is stored in the sixth register 184, and the second logic block 186 sends the contents of the fourth register 180 along with an indication that two of the items in the coherent data set are new, the stage 1 processor 144 may request the next latest data value stored in the fifth register 182.

The communication between the ASIC 142 and the stage one processor 144 may be conducted in accordance with a high-level data link control (HDLG) communication protocol. The communications may follow a framing scheme. In an embodiment, a frame from the ASIC 142 to the stage one processor 144 may comprise an 8-bit status byte and a 32-bit data word.

The stage one processor 144 may determine the current values of rotational velocity, rotational acceleration, and rotational jerk based on the data values received from the ASIC 142. In some contexts, the stage one processor 144 may be referred to as a second processing domain. In some contexts, a motion parameters process executing in the second processing domain may be said to determine the current values of rotational velocity, rotational acceleration, and rotational jerk. The number of gear teeth 104 on the gear coupled to the rotating machine 102 and the clock rate that is input to the counter 160 may be configured into the memory of the stage one processor 144 and/or coded into the software that the stage one processor 144 executes, for example a motion parameters process. As an example, the number of gear teeth 104 may be 48 gear teeth and the clock rate may be 4 MHz. The stage one processor 144 may determine the rotational velocity based on the delta teeth field and the delta count field of the data values as $$RPM = \left[\frac{60 \text{ s}}{\min}\right]\left[\frac{\text{revolution}}{48 \text{ teeth}}\right]\left[\frac{4,000,000 \text{ counts}}{\text{s}}\right]\left[\frac{\Delta \text{teeth}}{\Delta \text{count}}\right] \quad \text{(Eq 1)}$$

As an example, suppose the data values are determined once per revolution and hence the delta teeth value is 48 and further suppose that the delta count value is 66,667, the rotational velocity would be found according to Eq 1 to be about 3600 RPM.

One skilled in the art will readily be able to adapt Eq 1 as the number of gear teeth per revolution changes and/or as the frequency of the clock signal input to the counter 160 changes. For example, to adapt Eq 1 for different number of gear teeth per revolution, the denominator of the second bracketed term rightwards from the equals sign would be changed. Likewise, to adapt Eq 1 for a different clock frequency, the numerator of the third bracketed term rightwards from the equals sign would be changed. Additionally, one skilled in the art will be able to adapt Eq 1 to make it more readily amenable to efficient calculation by the stage one processor 144. For example, for an operation mode where the calculation of the rotational velocity is performed once per revolution and the number of gear teeth 104 coupled to rotating machinery 102 is 48, the calculation may be adapted to divide a constant value by the delta count value, for example dividing 240,000,000 by the delta count value. For different operation modes corresponding to different numbers of complete revolutions per determination of the data values, different constants can be used. Additionally, one skilled in the art will readily be able to adapt Eq 1 for counting rotating target passage events based on the number of rotating targets coupled to the subject rotating machine.

Having determined a sequence of rotational velocities, for example RPM, RPM$_2$, and RPM$_3$, a corresponding sequence of rotational accelerations Accl$_1$ and Accl$_2$, and a rotational jerk Jerk$_1$ may be determined by the first stage processor 144 as follows:

$$RotationalAcceleration = \frac{RPM_1 - RPM_2}{\Delta count_1 + \Delta count_2} * 2 * 4,000,000 \quad \text{(Eq 2)}$$

$$RotationalJerk = \quad \text{(Eq 3)}$$
$$\frac{Accl_1 - Accl_2}{\Delta count_1 + (2 * \Delta count_2) + \Delta count_3} * 4 * 4,000,000$$

where $\Delta count_1$ is the change or delta in the number of clock ticks or clock counts associated with the determination of RPM, $\Delta count_2$ is the change or delta in the number of clock ticks or clock counts associated with the determination of RPM$_2$, and $\Delta count_3$ is the change or delta in the number of clock ticks or clock counts associated with the determination of RPM$_3$. The term $$\left[\frac{2}{\Delta count_1 + \Delta count_2}\right]$$

in Eq 2 and the term $$\left[\frac{4}{\Delta count_1 + (2 * \Delta count_2) + \Delta count_3}\right]$$

Eq 3 each correspond to an average count per measurement period determined over the several measurement periods associated with the motion parameter. Note that the RPM calculated is an average speed over the subject measurement period. To increase accuracy of the acceleration and jerk calculations, the average count per measurement period is used.

Turning back to FIG. 1, each of the subsystems 120, 124, and 126 determine values of the current rotational velocity, rotational acceleration, and rotational jerk and output these current mechanical parameter values to a first voting component 146 that determines a voted value for current rotational velocity, rotational acceleration, and rotational jerk based on these three sets of inputs. The first voting component 146 can exclude the inputs of a subsystem 120, 124, 126 that may be failed or otherwise operating outside of normal limits by comparing its output mechanical parameter values to those mechanical parameter values output by the peer subsystems. The first voting component 146 may be a separate logic component or it may be part of one of the subsystems 120, 124, 126. The first voting component 146 outputs a common voted rotational velocity, voted rotational acceleration, and voted rotational jerk to each of the stage two processors of the subsystems, for example to the stage two processor 148 of the first subsystem 120.

The stage two processor 148 executes a processor resource management program, for example a real-time operating system, that runs a control program that executes iteratively. In some contexts, the stage two processor may be referred to as a third processing domain. The control program may be referred to in some contexts as a control process and may execute every 60 mS to every 100 mS. Alternatively, the control program may execute at a different frequency or rate. The control program determines one or more control commands based on the voted rotational velocity, voted rotational acceleration, and voted rotational jerk. The control commands, for example, may be intended to provide control signals to the machine drive 110 to maintain the machinery 102 at a desired operating point, for example rotating within a desired range of rotational velocity. The stage two processors 148 of each of the subsystems 120, 124, and 126 are substantially similar and send their output commands to a second voting component 150. The second voting component 150 can exclude the control commands of a subsystem 120, 124, 126 that may be failed or otherwise operating outside of normal limits by comparing its output control command values to those control command values output by the peer subsystems. The second voting component 150 may be a separate logic component or it may be part of one of the subsystems 120, 124, 126. The second voting component 150 outputs one or more voted control commands based on the control commands received from each of the stage two processors of the subsystems 120, 124, 126. The output voted control commands control the rotating machinery 102, for example modulating a steam valve providing steam to a steam turbine driving an electric generator.

Figure 1B:
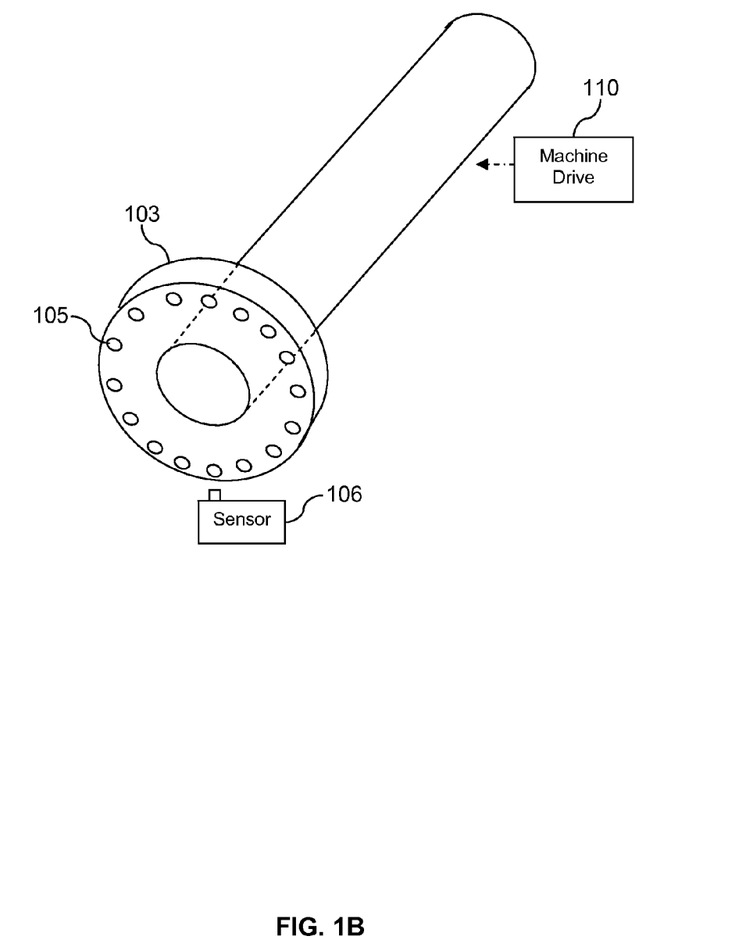
FIG. 1B is an illustration of a rotating targets coupled to a rotating machine according to an embodiment of the disclosure.

Turning now to FIG. 1B, a rotating disk 103 coupled to a rotating machine is described. The rotating disk 103 may be coupled to the shaft of a rotating machine. The rotating disk 103 comprises a plurality of rotating targets 105. In an embodiment, the rotating disk 103 may be composed of a non-ferrous metal such as brass. In an embodiment, the rotating targets 105 may be comprised of a ferrous metal. As the rotating disk rotates, rotating targets 105 pass proximate to the sensor 106 and the event of passage is detected by the sensor 106. A variety of devices may be used as rotating targets 105. The processing of rotating target passage events may be performed substantially as described above with reference to FIG. 1A, FIG. 2, and FIG. 3.

Figure 4:
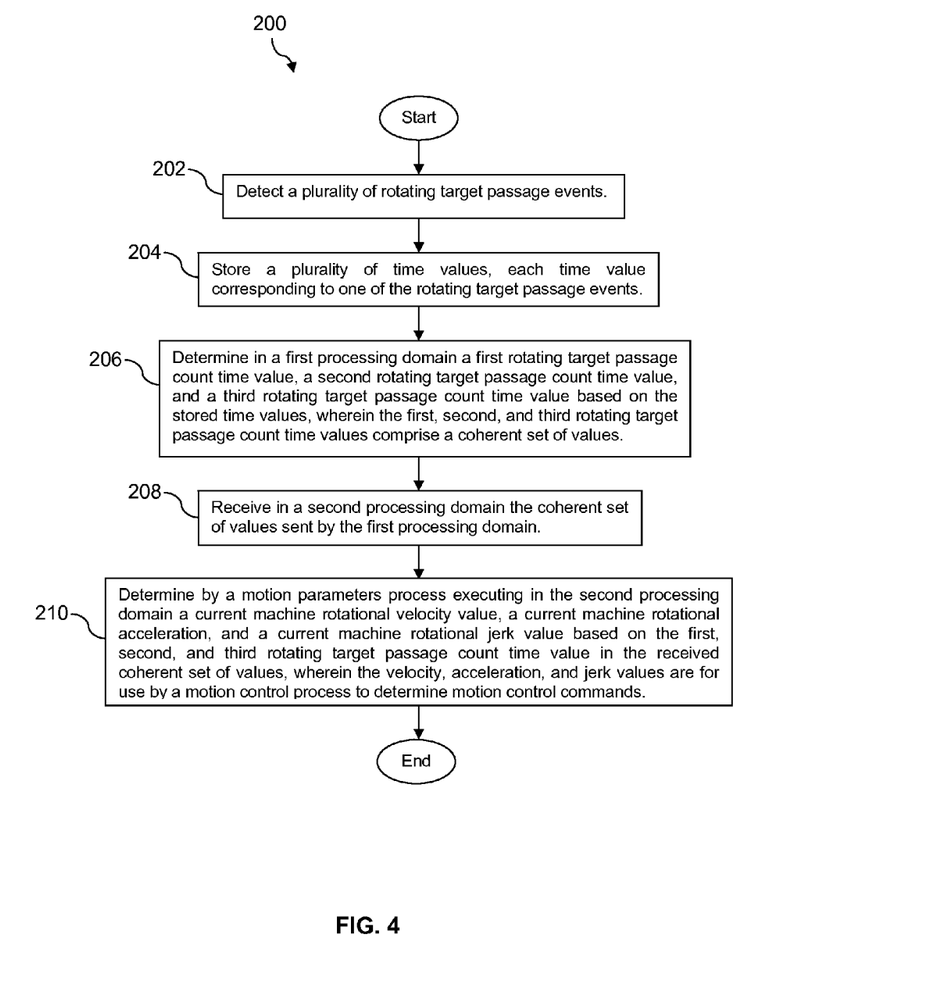
FIG. 4 is a flow chart of a method according to an embodiment of the disclosure.

Turning now to FIG. 4, a method 200 is described. At block 202, a plurality of rotating target passage events are detected. For example, a plurality of the gear teeth 104 are detected by the combination of the sensor 106, the conditioning comparator 140, and the edge detector 162 to have passed. At block 204, a plurality of time values are stored, each time value corresponding to one of the rotating target passage events. The time values may be stored in the memory 164. The time values may comprise the counter value output by the counter 160. The time values that are stored may not directly represent time but differences between two different stored time values may readily be converted to a time value based on the frequency of the clock input to the counter 160. The time values each may be stored along with a corresponding rotating target passage count value in the memory 164. Alternatively, the address of the locations in the memory 164 may serve in the role of a rotating target passage count value. For example, a gear tooth value may be stored in the same location of the memory 164 along with the corresponding time value and the difference between gear tooth values between two different locations in the memory 164 may be calculated by reading the gear tooth values from the two locations and calculating their difference. Alternatively, in an embodiment, the difference between the addresses of the two different locations in the memory 164 may be determined and may serve the same purpose of a delta tooth count value.

At block 206, a first, second, and third rotating target passage count time value are determined in a first processing domain. In an embodiment, the first rotating target passage count time value may be determined by logic blocks 172, 186 in the ASIC 142, wherein the ASIC 142 and/or the logic blocks 172, 186 may be referred to as the first processing domain. Alternatively, the first processing domain may execute together with a second processing domain and/or with a third processing domain on a single processor and/or on a multi-chip processor. When executed on a single processor and/or on a multi-chip processor, the first processing domain may be distinguished from the second processing domain and/or from the third processing domain by the functionality delegated to the first processing domain. In an embodiment, the first processing domain may concentrate on processing of input/output communication with interface devices such as the conditioning comparator 140 and other interface devices. The first rotating target passage count time value, the second rotating target passage count time value, and the third rotating target passage count time value comprise a coherent data set as defined above. In an embodiment, the first processor may be the ASIC 142, but in other embodiments the first processor may be a different processor.

At block 208, the coherent data set is received by a second processing domain. The second processing domain may be provided by the stage one processor 144. Alternatively, the first processing domain and the second processing domain may execute on the same processor and/or multi-chip processor. The first processing domain and the second processing domain may be distinguished, when executed on the same processor and/or multi-chip processor, by the responsibilities delegated to each processing domain.

At block 210, a current machine rotational velocity, acceleration, and jerk are determined by a motion parameters process executing in the second processing domain, based on the first, second, and third rotating target passage count time values. The current machine rotational velocity, acceleration, and jerk values determined by the second processing domain are for use by a motion control process to determine motion control commands.

The current machine rotational velocity, acceleration, and jerk values may be sent to a third processing domain, for example to the stage two processor 148, for processing by a motion control process. The motion control process may determine a motion control command, for example a motion control command controlling engagement of a clutch coupling the rotating machine 102 to other machinery, such as coupling a steam turbine to an electric generator, a motion control command controlling a steam inlet valve that throttles supply of high temperature, high pressure steam to a steam manifold associated with a steam turbine, or other control command and/or control commands.

In an embodiment, the motion parameters process may execute in a first iteration loop in the second processing domain and the motion control process may execute in a second iteration loop in the third processing domain. The first iteration loop may cycle at a higher rate or with higher frequency than the second iteration loop. By determining the motion parameters of rotational velocity, acceleration, and jerk in the faster first iteration loop, the current value of the higher order derivative parameters, namely the acceleration and jerk parameters which are the second and third time derivatives of angular position of the rotating machine 102, may be determined more rapidly and be more up-to-date with reference to changing operating conditions. As is known to one skilled in the art, in the discrete time processing typically employed in computer/processor based control systems each successive higher order derivative depends on successively earlier data. For example, a first order derivative may be calculated based on a present value and one previous value, a second order derivative may be calculated based on a present value and two previous values, a third order derivative may be calculated based on a present value and three previous values. Calculating the rotational acceleration and jerk in the higher frequency iteration loop of the second processing domain determines the rotational acceleration and jerk with less time lag and/or time delay than would calculating the rotational acceleration and jerk in the lower frequency iteration loop of the third processing domain. By determining the acceleration and jerk quicker and/or with less time lag, the control process executing in the third processing domain is able to respond more rapidly to changed rotational conditions, such as rapid acceleration and/or jerk increase in the circumstance of exceptional operating conditions, such as a turbine trip that may threaten to overspeed the turbine if power is not removed from and/or reduced to the turbine, for example by throttling back a steam control valve.

Figure 5:
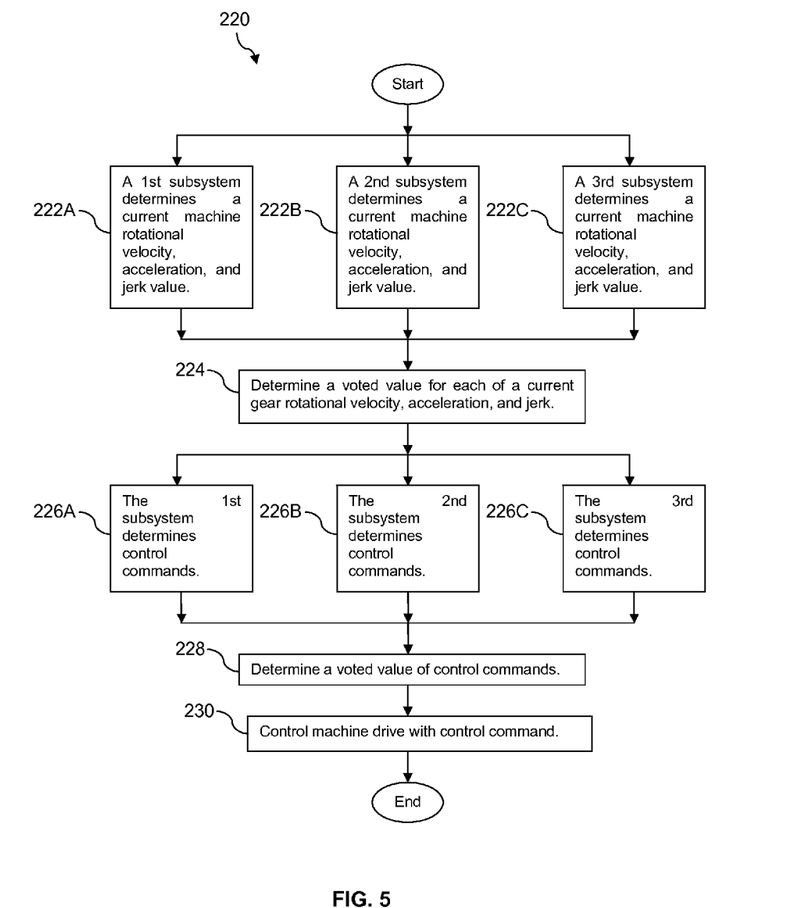
FIG. 5 is a flow chart of a method according to an embodiment of the disclosure.

Turning now to FIG. 5, a method 220 is described. In block 222A a first subsystem, for example the stage one processor 144 of the subsystem A 120, determines a current rotational velocity, a current rotational acceleration, and a current rotational jerk of a rotating machine, for example the rotating machinery 102. In block 222B a second subsystem, for example the subsystem B 124, determines a current rotational velocity, a current rotational acceleration, and a current rotational jerk of the rotating machine. In block 222C a third subsystem, for example the subsystem C 126, determines a current rotational velocity, a current rotational acceleration, and a current rotational jerk of the rotating machine. The processing of each of the blocks 222A, 222B, and 222C may be substantially similar to the method 200 discussed above with reference to FIG. 4.

In block 224, a voted value for each of a current rotational velocity, a current rotational acceleration, and a current rotational jerk is determined based on the corresponding rotational velocity, acceleration, and jerk produced by each of the subsystems in blocks 222A, 222B, 222C. When the values of a rotational parameter are similar in magnitude, the voted rotational parameter value may be determined as the average of the three values or alternatively the median rotational parameter value may be selected as the voted rotational parameter value. When one of the values of a rotational parameter is substantially different from the remaining two values of the rotational parameter, the outlier value may be disregarded, and the voted rotational parameter value may be determined as the average of the remaining two values of the rotational parameter.

In block 226A, the voted current rotational velocity, the voted current rotational acceleration, and the voted current rotational jerk values are processed by the first subsystem, for example by the stage 2 processor 148 of the subsystem A 120, to determine one or more control commands. In block 226B, the voted current rotational velocity, the voted current rotational acceleration, and the voted current rotational jerk values are processed by the second subsystem to determine one or more control commands. In block 226C, the voted current rotational velocity, the voted current rotational acceleration, and the voted current rotational jerk values are processed by the third subsystem to determine one or more control commands.

At block 228, a voted value of the control commands is determined based on the control commands produced by the three subsystems in blocks 226A, 226B, 226C. In some cases, for example when a control command is a numerical value, the voted value may be determined by averaging or selecting a mean value from the three sets of control commands output by the subsystems when the control commands are not substantially in disagreement. When an outlier value is produced by one of the subsystems, this outlier value may be discarded and not taken account of in determining the control commands. Alternatively, when a control command is a discrete value, for example a clutch engage/disengage command, the voted output may be based on a majority decision. If two of the three subsystems produce a first discrete value, for example "clutch engage" and one of the three subsystems produce a second discrete value, for example "clutch disengage," the voted command is determined to be the first discrete value, for example the "clutch engage" command.

At block 230, the voted control command and/or voted control commands control a drive coupled to the rotating machinery, for example to control a valve position modulating the supply of steam to a steam turbine. The method 220 then exits. It is contemplated that the processing of the method 220 may be performed iteratively, for example executing in a control loop.

Figure 6:
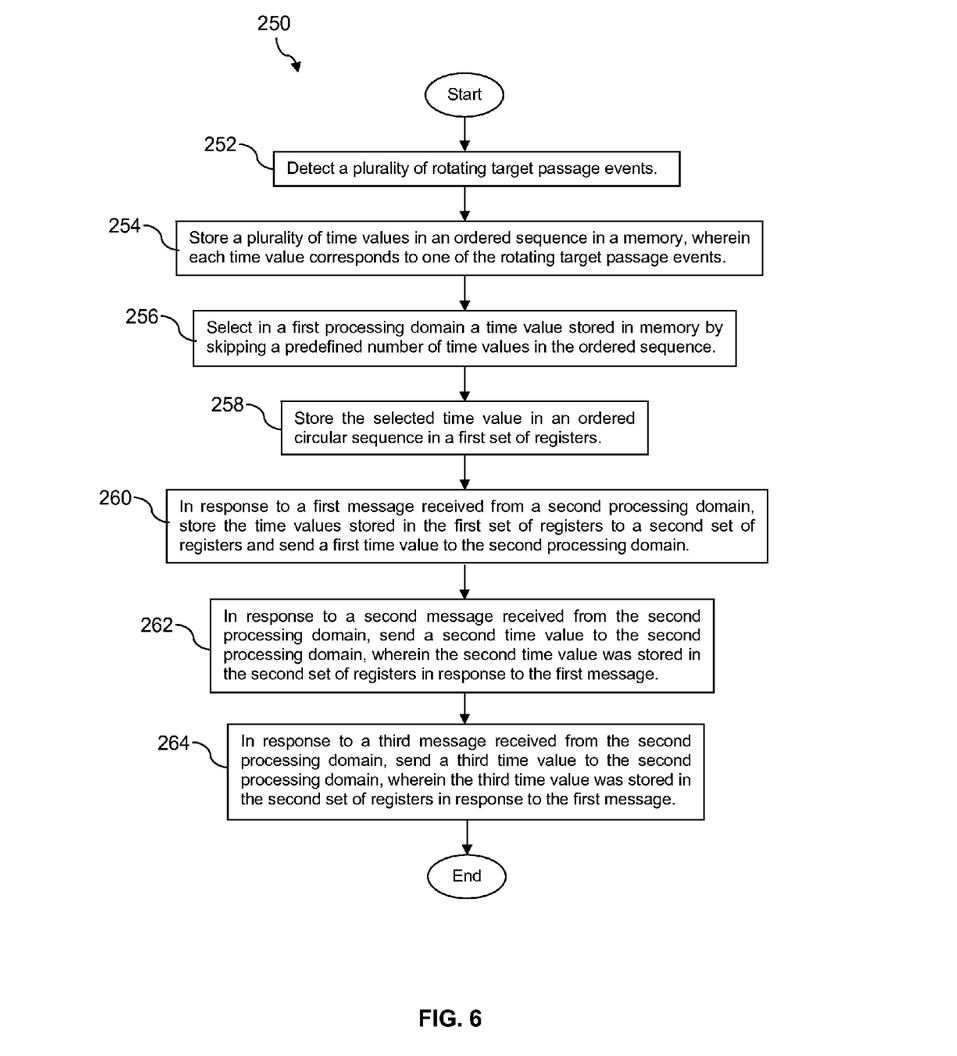
FIG. 6 is a flow chart of a method according to an embodiment of the disclosure.

Turning now to FIG. 6, a method 250 is discussed. At block 252, a plurality of rotating target passage events is detected, substantially as described above with reference to block 202 of FIG. 4. At block 254, a plurality of time values are stored in an ordered sequence in a memory, wherein each time value corresponds to one of the rotating target passage events. The sequenced storage of the time values in the memory promotes the ease of associating a time value to a rotating target passage event and/or to a rotating target passage count. For example, a first time value associated with an m-th rotating target passage event may be stored in an n-th location in memory; a second time value associated with an (m+1)-th rotating target passage event may be stored in an (n+1)-th location in memory, a third time value associated with an (m+2)-th rotating target passage event may be stored in an (n+2)-th location in memory. The m, m+1, and m+2 rotating target passage events may be in sequence with each other, with no rotating target passage events between these. The n, n+1, and n+2 locations in memory may be adjacent to each other, for example have memory addresses in sequence. Alternatively, the n, n+1, and n+2 locations in memory may not be adjacent to each other but may otherwise be indexed or identified based on a sequence of addresses and/or identifiers, for example through indirect addressing.

At block 256, a first processing domain selects a time value stored in the memory by skipping a predefined number of time values in the ordered sequence of memory locations. For example, if the predefined number of time values to be skipped is 48, and if the last time value was read from the k-th location in memory, the (k+1)-th location in memory through the (k+47)-th location in memory may be skipped over and the (k+48)-th location in memory may be read. The predefined number of time values may be selected based on a number of rotating target passage events per revolution, a number of rotating target passage events per two revolutions, a number of rotating target passage events per three revolutions, or a number of rotating target passage events per some other number of revolutions. Alternatively, in a slower rotation regime of the rotating equipment 102, the predefined number of time values may be less than the number of rotating target passage events per revolution. The predefined number may change during operation of the system 100, as described above, to provide a balance of accuracy and timeliness of update of the rotational motion parameters.

At block 258, the selected time value is stored in an ordered circular sequence in a first set of registers, for example registers 174, 176, 178. Alternatively, the selected time value is stored in a first set of registers that is not circular, in which case storing a value into the first register 174 may cause the previous value stored in the first register 174 to be stored in the second register 176, storing the value in the second register 176 may cause the previous value in the second register 176 to be stored in the third register 178, and storing the value in the third register may cause the previous value in the third register 178 to be overwritten and lost.

At block 260, in response to a first message received from a second processing domain, for example from the stage 1 processor 144, the time values stored in the first set of registers is stored in a second set of registers, for example registers 180, 182, 184. Additionally, a first time value is sent to the second processing domain.

At block 262, in response to a second message received from the second processing domain, a second time value is sent to the second processing domain. The second time value, like the first time value, was stored in the second set of registers in response to the first message. At block 264, in response to a third message received from the second processing domain, a third time value is sent to the second processing domain. The third time value, like the first time value and the second time value, was stored in the second set of registers in response to the first message. After the time values stored in the first set of registers are stored in the second set of registers, the values in the first set of registers may be overwritten, for example as the processing of blocks 252, 254, 256, and 258 continue. The time values stored in the second set of registers, however, remain stable and unchanged until another message is received from the second processing domain signaling to copy time values from the first set of registers to the second set of registers.

Figure 7:
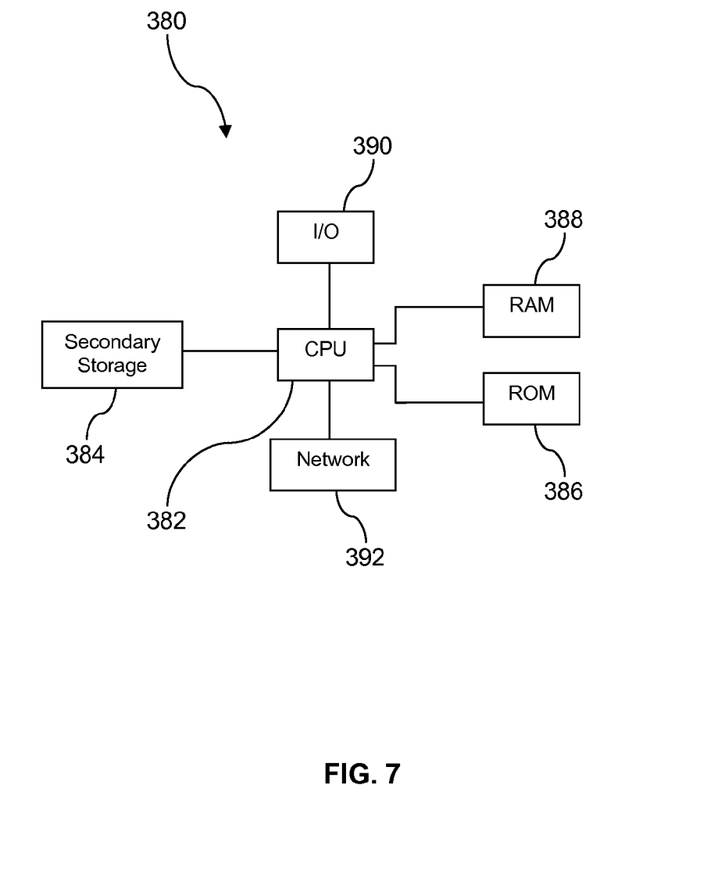
FIG. 7 is an illustration of a computer system according to an embodiment of the disclosure.

FIG. 7 illustrates a computer system 380 that may be suitable for implementing some aspects of one or more of the embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as non-transitory storage and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An apparatus, comprising:
a detector configured to receive a rotary motion electrical input signal and an electrical counter signal from a rotating machine, the detector further configured to send a plurality of time values based on the electrical input signal and the electrical counter signal;
a memory coupled to the detector for receiving the plurality of time values sent by the detector, the memory storing the plurality of time signals received from the detector in an ordered sequence; and
a logic component configured to select one or more of the plurality of time values in the ordered sequence stored in the memory, wherein the logic component is coupled to the memory, wherein the selected time values are separated from each other by a predefined number of time values in the ordered sequence, the logic component further configured to read from the memory the selected time values, the logic component further configured to determine a data value as a function of the selected time values, wherein the data value is at least one of a current machine rotational velocity value, a current machine rotational acceleration value, and a current machine rotational jerk value, wherein the current machine rotational velocity value, the current machine rotational acceleration value, and the current machine rotational jerk value are each adapted for use by an apparatus in a motion control process to determine motion control commands.

2. The apparatus of claim 1, wherein the detector is configured to detect rotating target passage events of the rotating machine in the input signal and wherein each of the plurality of time values is uniquely associated with a detected rotating target passage event.

3. The apparatus of claim 1, wherein the data value comprises one element of a coherent set of data values.

4. The apparatus of claim 3, wherein the logic component is configured to send the coherent set of data values in response to a request message.

5. The apparatus of claim 4, wherein the logic component is configured to store, in the memory, the most recently determined coherent set of data values in response to the request message.

6. The apparatus of claim 5, wherein the logic component is configured to determine how many data values in the coherent set of data values have not been sent, and send the latest data value in a response message, wherein the response message further comprises an indication of how many data values in the coherent set of data values have not been sent.

7. The apparatus of claim 1, wherein the data value comprises a rotating target passage count value and an elapsed time value.

8. The apparatus of claim 1, wherein each of the plurality of time values corresponds to a tooth of a rotating gear of the rotating machine.

9. A method of determining motion parameters for a rotating machine, comprising:
   receiving, by a data processing system, a rotary motion electrical input signal from a sensor coupled to the rotating machine;
   detecting, by the data processing system, a plurality of rotating target passage events using the electrical input signal received from the sensor;
   storing, by the data processing system, a plurality of time values in an ordered sequence in a memory, wherein each of the plurality of time values corresponds to one of the rotating target passage events;
   selecting, by the data processing system, in a first processing domain of the data processing system one or more time values of the plurality of time values stored in the memory, wherein a most recently selected time value is separated from a previously selected time value by a predefined number of time values in the ordered sequence;
   reading, by the data processing system, the selected time values from the memory;
   storing, by the data processing system, the selected time values in an ordered circular sequence in a first set of registers;
   in response to a first message received from a second processing domain of the data processing system, storing the selected time values stored in the first set of registers to a second set of registers and sending a first time value of the selected time values to the second processing domain;
   in response to a second message received from the second processing domain, sending, by the data processing system, a second time value of the selected time values to the second processing domain, wherein the second time value was stored in the second set of registers in response to the first message;
   in response to a third message received from the second processing domain, sending, by the data processing system, a third time value of the selected time values to the second processing domain, wherein the third time value was stored in the second set of registers in response to the first message; and
   determining at least one of a current machine rotational velocity value, a current machine rotational acceleration value, and a current machine rotational jerk value as a function of the first time value, the second time value, and the third time value, wherein the current machine rotational velocity value, the current machine rotational acceleration value, and the current machine rotational jerk value are each adapted for use by an apparatus in a motion control process to determine motion control commands.

10. The method of claim 9, wherein the first message is sent by the second processing domain in accordance with a framing scheme.

11. The method of claim 9, wherein the plurality of time values stored in the memory comprises a rotating target passage count field and a time field.

12. The method of claim 11, wherein the time field of the plurality of time values stored in the memory comprises 24 bits.

13. The method of claim 9, wherein the selected time values stored in the ordered circular sequence comprises a coherent data set.

14. The method of claim 9, wherein each of the plurality of time values corresponds to a tooth of a rotating gear of the rotating machine.

* * * * *